July 18, 1961   C. P. FAZIO ET AL   2,992,795
BALLOON VALVE
Filed Aug. 4, 1958

United States Patent Office 2,992,795
Patented July 18, 1961

2,992,795
BALLOON VALVE
Charles P. Fazio, Hull, Robert M. Nelson, Arlington, and Beverly A. Nickerson, Concord, Mass., assignors to W. R. Grace & Co., Cambridge, Mass., a corporation of Connecticut
Filed Aug. 4, 1958, Ser. No. 752,765
2 Claims. (Cl. 244—31)

This invention relates to ballon valves, more particularly this invention relates to valves for constant level balloons.

Due to the constantly advancing frontiers of high altitude research a need has arisen for a balloon which will float at a predetermined substantially constant level of altitude in the range of between about 30,000 and about 100,000 feet. In general the ceiling altitude of a balloon depends upon the volumetric size of the gas in the balloon and therefore a control of the gaseous volume would also control the altitude of flight of the balloon.

One of the more conventional methods of controlling the aforesaid gaseous volume has been the utilization of open neck non-expansible balloons, but these are expensive, large and difficult to launch. A comparatively more recent innovation has been the use of smaller, cheaper expansible type balloons which are equipped with a specially designed gas release mechanism.

The gas release mechanism which is generally utilized is a string operated type valve, which may be fitted in the neck of the balloon, and which automatically releases gas to the atmosphere when the volume of gas within the envelope of the balloon exceeds a predetermined value. The general design of this type mechanism is such that the string, one end of which is attached to the gaseous release element and the other end of which is secured to the inner wall surface of the balloon at a point diametrically opposite the neck, is actuated at a predetermined balloon volume by the differential pressure which the balloon wall is subjected to. One of the general requirements for this type mechanism is that it must be easily actuated. If it is not actuated by a slight differential pressure, which is the difference between the pressure of the entrapped gas and the pressure of the atmosphere, the balloon's surface will dimple inwardly at the point where the string is attached to the balloon wall. This dimpling effect is due to the flexible character of the balloon wall. Another general requirement for the mechanism is that it must be designed to automatically close after the desired amount of gas is released to the atmosphere.

Designs of this class mechanism which have been heretofore utilized are the plunger equipped cylinder type and the ball equipped cylinder type. Although balloons equipped with the aforesaid mechanisms should normal float at constant levels of altitude, difficulties with the mechanisms themselves have decreased the performance reliability of the balloons. The difficulties which may be generally encountered are a premature actuation of the gas release mechanism, the mechanism's failure to close after release of the excess gas, or failure of the mechanism to operate at all. These difficulties could result in flights below predetermined ceiling levels, or short life flights, or flights in which the balloon would overshoot the ceiling level and ultimately burst.

The former type of the aforesaid mechanisms depends for its gas release operation upon the lifting of a plunger, while its closing action is substantially dependent upon the weight of the plunger itself. This type mechanism is susceptible to defective operation due to the binding of the plunger in the cylinder as a result of inherent friction, or due to the freezing action of the high altitude temperature, which may be as low as about —70° C., upon the mechanical parts. Such defective operation could result in either the failure of the valve to operate at all or failure to close after the gas release action. The latter type of the aforesaid mechanisms depends for its operation upon a calibrated tension spring which is attached to a ball which is utilized as a valve release element. The tension of the spring must be of such a magnitude that it will allow the displacement of the ball from its valve seat at a predetermined balloon volume and yet of such a magnitude that it will return the ball to its valve seat after a release of the desired amount of gas from the envelope. The latter type of mechanism may vary in performance when subjected to the large variation in temperature which is encountered in ascent to high altitudes, or its effective operation may also be susceptible to premature actuation due to an entwining of the actuation string or defective operation due to interference of the string with the effective action of the ball by preventing it from reseating on the valve seat.

The balloon valve of the present invention is operably designed to not only effectively allow the release of the desired amount of gas from the envelope at a predetermined volume, but also to automatically close thereby effectively sealing off the desired amount of entrapped gas in the envelope. The gas release plate of this balloon valve is not susceptible to interference from the actuation string because the actuation string is retained in convoluted position prior to activation of the valve; nor is this balloon valve susceptible to premature activation because the convoluted actuation string is made freely available by being retained on a revolvable spool. There is no danger of defective operation due to mechanical friction because a flexible flapper type of gas release plate is utilized rather than a plunger type. The inherent design of the flexible flapper type release plate freely allows the return of the plate to its normally closed position aided by the slight back pressure which is due to the entrapped gas thereby providing an effective seal for the envelope. There exists no need for expensive calibrated springs in this system, and therefore the difficulties which may be due to the effect of variation in temperature are not encountered in the operation of the present valve.

One of the principal objects of this invention is a gas release valve mechanism for constant level balloons which is effective in operation, and cheap and simple in design. Another object of this invention is a valve of the aforesaid type which will not only allow the release of the desired amount of gas to the atmosphere but which will also close effectively enough to seal the envelope off against leakage when the envelope contains the desired volume of gas. Also, an object of this invention is a valving mechanism which has the aforesaid attributes but which also has a gas release plate which retains its flexibility at very low temperatures, and which utilizes the slight back pressure of the envelope's gas in facilitating its closing and sealing action. These and other objects of the invention will become apparent from the description and the drawing.

Figure 1:
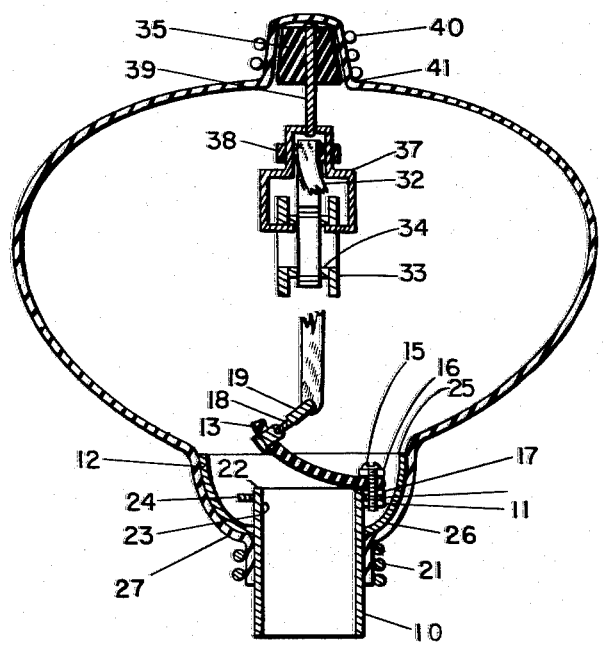
FIGURE 1 is a sectional view showing the valve and reeling mechanism in place in an envelope of a balloon.
Figure 2:
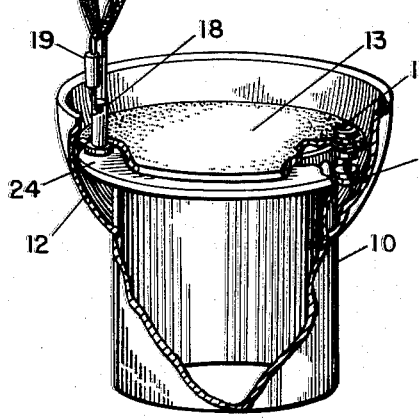
FIGURE 2 is an elevational view of the valve with a cross sectional cutaway showing the interior of the same.

The valve assembly comprises a collar 10, which may generally be in the shape of a cylinder of open end construction, as shown in FIGURE 1, whose axial bore serves as an intake-exhaust port and whose upper end extremity serves as a valve seat 22. A valve plate 13, which is made from material such as gum silicone which retains its flexibility at temperatures as low as about −70° C., and which may generally be circular in shape, is axially aligned with the intake-exhaust port so that in its normal position it will be substantially flush with the valve seat 22 of the cylinder and will provide a substantially flush closure for the port. The valve plate 13 is of substantial size in relation to the cylinder 10 so that in communicating with the cylinder it will floppily overlap the outer circumference of the cylinder and so that the degree of overlap of the plate 13 operably enhances the effective sealing power of the back pressure of the gas. An outwardly projecting circumferential flange 14 is laterally positioned on the outer wall facing of the cylinder so that the upper portion of the cylinder projects above the upper shoulder 24 of the circumferential flange 14 forming a rimming neck 23. Screws 15, 15', which secure the valve plate 13 in operable position on the valve seat 22, pass through the valve plate 13 in close proximity to its peripheral edge and project downward through the circumferential flange 14 and are secured there by means of nuts 11, 11'. The screws 15, 15' are aligned in position by means of a spacing segment 17 through which they pass and which is positioned between the lower surface of the valve plate 13 and the upper shoulder 24 of the circumferential flange 14. The screws 15, 15' are also secured in position by means of a clamping segment 16 which is positioned between the upper surface of the valve disk 13 and the lower surface of the screw heads 15, 15'. An actuation plug 18 projects upwardly through the valve plate 13 at a position which is in close proximity to the peripheral edge of the plate 13 but which provides a sufficient clearance with the outer wall facing of the rimming neck 23. The plug 18 is positioned so that it lifts the plate 13 with the maximum amount of leverage possible. A protective shield 12, which may be in the form of an inverted hollow frustum, is laterally positioned on the outer wall facing of the collar 10 at a position below the circumferential flange 14. The frustum is positioned in such a way that the base of the frustum 25 projects above the upper surface of the valve plate 13, and the outer wall facing 26 of the frustum is in contact with the inner wall facing of the neck of the balloon thereby preventing the wall of the balloon from interfering with the valve plate 13. The valve assembly is fitted in the neck 27 of the balloon and is secured there by means of cement and a lashing 21, and the lower portion of the collar 10 extends below the neck 27 and is in receptive position to receive the inflation nozzle (not shown) used to inflate the balloon.

Figure 3:
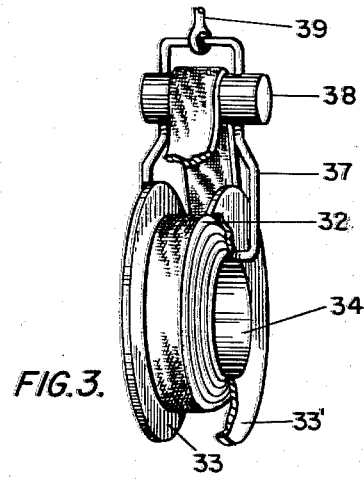
FIGURE 3 is an elevational view of the reeling mechanism.

The reeling mechanism comprises a spooling element 34 in the form of a wheel which may generally be of cylindrical shape, as illustrated in FIGURE 3, and whose convex surface serves as a retaining area for the convoluted cotton actuating tape 32 which was initially attached to and wound thereon. A guide plate 33 is attached to each of the sides of the spooling element 34, in such a way that the inner surface area of the guide plate 33 is positioned upon the smooth base surface area of the spool 34. The guide plate 33 is of substantial size in relation to the spool so that it projects outwardly from the circumference of the spool 34 and the resulting projection is of sufficient magnitude so that it is adapted to guide the actuating tape 32 into its convoluted position. The reeling mechanism is rotably supported on a suspended hanger 37 whose lower portion is adapted as an axle upon which the spool may revolve. Transversing the sides of the upper portion of the suspended hanger is an unwinding guide 38 across which the actuating tape 32 passes. The hanger 37 is suspended by means of a cord 39, one end of which is attached to the upper portion of the hanger 37, and the other end of which is secured to a rubber stopper 35 inserted in the nipple neck 41 of the balloon and secured there by means of a lashing 40. The nipple neck 41 of the balloon is located at a point diametrically opposite the open neck 27 of the balloon.

*Operation.*—In general, as the balloon ascends to its ceiling altitude, the volume of gas within the envelope expands due to the decreasing pressure of the atmosphere upon the outer surface of the balloon. As the size of the balloon is increased the distance between the point at which the suspension cord 39 is affixed to the inner surface of the balloon and the point at which the actuating plug 18 is affixed, the valve plate 13 is increased. Also, the cotton actuating tape 32, one end of which is anchored to the actuating plug 18, by means of a snap fastener 19, is subject to a pulling stress due to this increase in distance and the differential pressure which the balloon wall is subjected to, resulting in an unwinding of the actuating tape 32 from the spool 34 on which it is stored. When the unwinding of the actuating tape 32 is substantially complete, a point is reached at which the tape is attached to the spool 34 and beyond which the tape will unwind no further. At this stop point the stress utilized in unwinding the tape 32 is communicated through the actuating tape to the valve actuating plug 18 resulting in the lifting of the valve plate 13 from its valve seat 22, and thereby facilitating the escape of entrapped gas through the port to the atmosphere. As the entrapped gas is released to the atmosphere the volume of gas within the envelope is decreased, also resulting in a decrease of the stress which the actuating tape 32 is subjected to. With decreasing stress being communicated through the actuating tape 32, the valve plate 13 is allowed to communicate, i.e. approach and return to its normal position, with the valve seat 22 aided by its own weight and by the back pressure of the remaining gas entrapped in the envelope upon the upper surface of the valve plate 13, thereby closing the port and effectively sealing off the envelope from the atmosphere.

The foregoing drawings and description illustrate the preferred embodiment of the invention, however, it is not to be construed as limited to the specific form shown. For example, the size of the valve mechanism substantially depends on the size of the balloon in which it will be utilized. Also, the collar 11 of the valve mechanism may vary in shape so long as it may be tightly sealed in the neck of the balloon. The valve plate 13, may be made from any one of a number of elastic materials which retain their flexibility at very low temperatures and which are commercially available although we have described the plate 13 in its preferred form as silicone rubber. The shape and size of the valve plate 13 may also vary within the requirement that it must be operably designed so that its area will substantially overlap the area of the port, and will be substantially flush with the valve seat 22, and will provide a substantially flush closure for the port. The collar 10, circumferential flange 14, and protective shield 12, may be of one unit construction, and in the alternative may be of individually separate construction with the means of attachment depending on the materials from which the various parts are made. It has been found that a lightweight plastic, which is comparatively strong, is suitable for construction of these parts, however, the parts may be made from a great many materials whose weight and strength will not interfere with the effective performance of the balloon.

The reeling mechanism may also be of one unit construction, or the spool 34, and side guide plates 33, 33', may be of separate construction operably attached by conventional means. The size and length of the actuating tape 32 depend substantially upon the size of the balloon and valve with which they are utilized. The cord suspension 39 may generally be attached to the top inner surface of the balloon by several conventional means, but we have preferably secured it by means of a stopper 35 which is inserted in the nipple neck 41 of the balloon and secured there by means of a lashing 40.

The valve mechanism and its reeling mechanism accessory are simple in design, cheap and easily manufactured. It has been found that balloons equipped with the aforedescribed valve assembly have a greater overall performance reliability at high altitudes because of the dependability and effectiveness of the valve assembly itself.

We claim:

1. A free rising gas filled expandable meteorological balloon adapted to maintain a substantially constant high altitude level of between about 30,000 feet and about 100,000 feet comprising: a hollow spherical expansible envelope; a passage communicating between said hollow envelope and the atmosphere; a cylindrical collar fitted in said passage, said collar having an axial bore which serves as a port communicating between said hollow envelope and the atmosphere; a flexible circular valve plate overlying the inner circumference of said collar to close the same, said valve plate attached at one edge to said collar so as to fasten said plate against said collar; an actuating tape one end of which is attached to the free end of said flexible valve plate and the other end of which is retained in convoluted position; a revolvable spool operably suspended within said envelope and adapted to retain said convoluted tape in operable position; said envelope actuating said tape to control said valve plate and to release gas whenever the diameter of said balloon exceeds a predetermined value.

2. A gas release valve adapted for an expansible meteorological balloon adapted to maintain a substantially constant altitude level between about 30,000 feet and 100,000 feet said valve comprising: a cylindrical collar having an axial bore which serves as a port for said balloon and one of the extremital ends of which serves as a valve seat; a flexible valve plate overlying the inner circumference of said collar providing a flush closure for said port, said valve plate attached at one edge to said collar so as to fasten said plate against said collar; an actuating tape one end of which is attached to the free end of said flexible valve plate and the other end of which is retained in convoluted position; a revolvable spool suspended within said balloon and adapted to retain said convoluted tape in operable position, said balloon controlling said valve plate thereby releasing gas whenever the diameter of the balloon exceeds a predetermined value.

References Cited in the file of this patent

UNITED STATES PATENTS

| | | |
|---|---|---|
| 1,384,268 | Maranville | July 13, 1921 |
| 1,419,177 | Stahl | June 13, 1922 |
| 1,553,340 | Upson | Sept. 15, 1925 |
| 2,492,800 | Isom | Dec. 27, 1949 |

FOREIGN PATENTS

| | | |
|---|---|---|
| 9,799 | Great Britain | 1908 |